Nov. 15, 1955        L. REEVE        2,723,912
METHOD OF AND PLANT FOR THE TREATMENT OF IRON ORE
Filed July 18, 1950        2 Sheets-Sheet 1
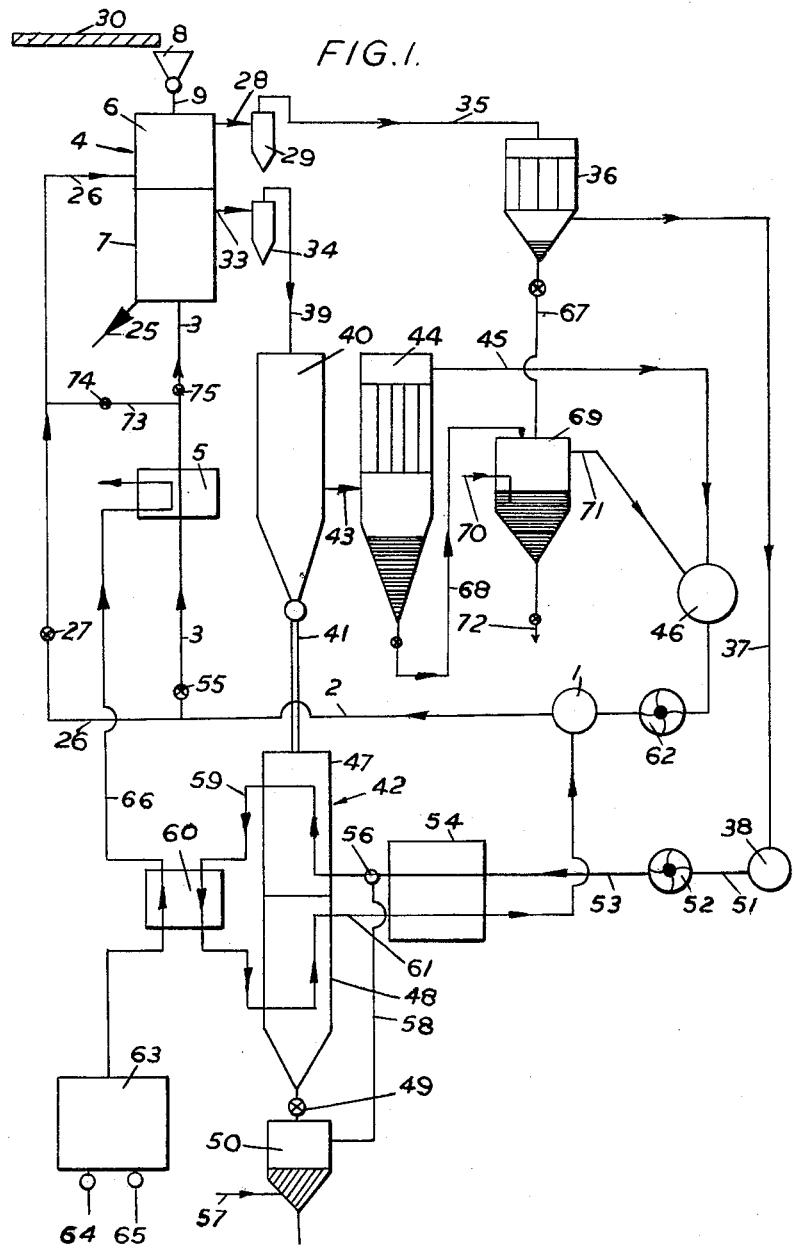
Inventor
LEWIS REEVE
By H. C. Dilsend
Attorney Nov. 15, 1955  L. REEVE  2,723,912
METHOD OF AND PLANT FOR THE TREATMENT OF IRON ORE
Filed July 18, 1950  2 Sheets-Sheet 2
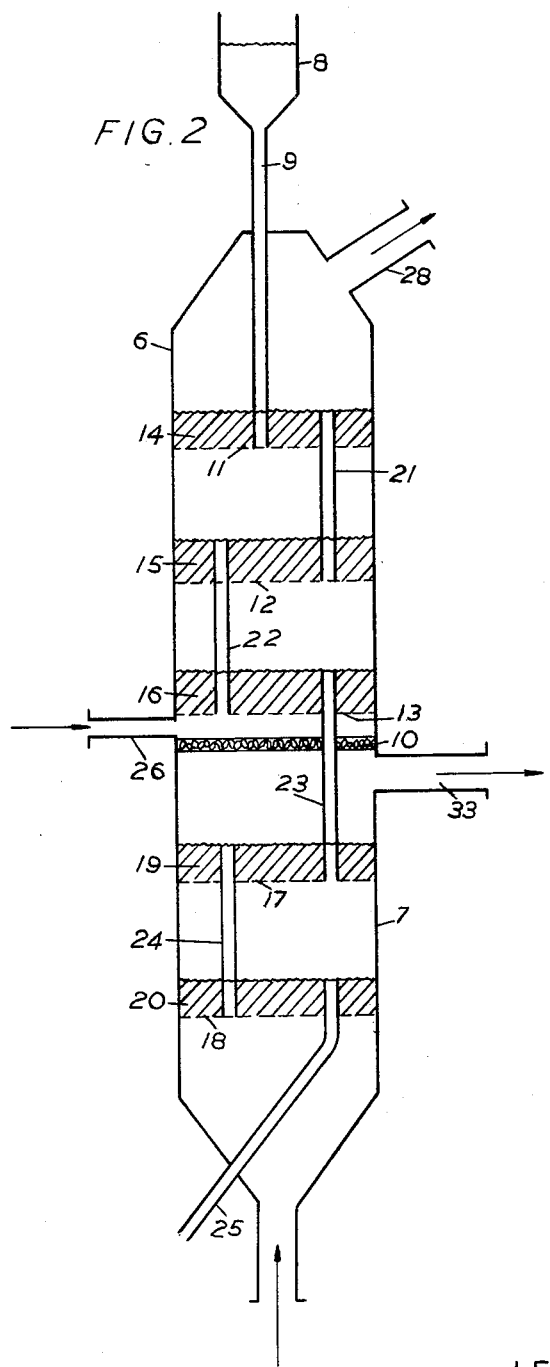
Inventor
LEWIS REEVE

United States Patent Office 2,723,912
Patented Nov. 15, 1955

2,723,912

METHOD OF AND PLANT FOR THE TREATMENT OF IRON ORE

Lewis Reeve, Sheffield, England, assignor to The United Steel Companies Limited, Sheffield, England, a British company Application July 18, 1950, Serial No. 174,491

Claims priority, application Great Britain July 21, 1949

17 Claims. (Cl. 75—113)

This invention relates to the recovery of iron from iron ore and to plants for use therein.

It has been known for many years that it is possible to distill ferric chloride from iron ore by treatment with hot hydrochloric acid gas. It has also been suggested that the ferric chloride so produced could then be treated with gases containing hydrogen to produce metallic iron and fresh hydrochloric gas, which could then be used again for distilling more ferric chloride from fresh ore. The reactions concerned are:

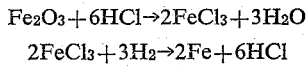

$$Fe_2O_3 + 6HCl \rightarrow 2FeCl_3 + 3H_2O$$

$$2FeCl_3 + 3H_2 \rightarrow 2Fe + 6HCl$$

Despite the apparent simplicity of the process, no large-scale manufacture of sponge iron by it has yet been carried out owing to numerous practical difficulties. These difficulties, which have not apparently been appreciated by earlier workers, include the slowness of the chloridising reaction due to the slow diffusion of the very heavy ferric chloride vapour from inside the ore; the formation of water vapour in the chloridising reaction which, under certain conditions, will lead to the formation of aqueous hydrochloric acid and damp sticky hydrates of ferric chloride; the formation under certain conditions of the non-volatile compounds, ferrous chloride ($FeCl_2$) and ferric oxychloride (FeOCl); and finally the fact that both the reactions are reversible, which leads to the production of equilibrium mixtures in the gaseous phase and tends to prevent the reaction going fully to the right-hand side in either equation.

It is the principal object of the invention to provide a method by which sponge iron can be produced from iron ore, particularly low-grade ore, economically and on a commercial scale, by conversion of ferric oxide in the ore to ferric chloride and subsequent reduction of the ferric chloride.

It is another object of the invention to provide an improved process for converting ferric oxide in iron ore to ferric chloride.

A further object of the invention is to provide an improved two-stage process for treating ferric oxide with hydrochloric acid gas to yield ferric chloride.

Yet another object of the invention is to treat fluidised beds of iron ore with mixtures of hydrochloric acid gas and hydrogen.

A still further object of the invention is to provide an improved plant in which gas mixtures used in treating iron ore circulate in a particularly advantageous manner.

If sponge iron is to be produced economically from iron ore by the reactions described, it is necessary in practice to use as little fresh hydrochloric acid gas and hydrogen as possible. According to one important feature of the invention a circulating mixture of hydrochloric acid gas and hydrogen is used and is enriched in hydrochloric acid gas before coming into contact with the ore and in hydrogen before coming into contact with the ferric chloride. In other words, this circulating mixture varies in composition in a controlled manner at different points in the plant.

Another important feature of the invention consists in treating the ore with the hydrochloric acid gas in two stages. The first is a low-temperature stage and is carried on at from 100 to 200° C., that is to say, at a temperature high enough to expel a substantial proportion of the water vapor formed but at the most only a small proportion of the ferric chloride formed. In the second stage the ore is heated with further hydrochloric acid gas at a temperature between 200 and 400° C. to volatilise the ferric chloride already present and to form additional ferric chloride from the ferric oxide remaining in the ore. All this ferric chloride is removed as a gas from the solid residue. By removing the steam at an intermediate stage in the treatment, it becomes possible to drive the first reaction hard to the right and so to remove as ferric chloride a very large proportion of the ferric oxide in the ore, and to do this without using an unduly large excess of hydrochloric acid gas.

A further important feature of the invention is the treatment of the ore in the form of a fluidised bed, the gas being delivered into the ore at such a velocity as to maintain the particles of the ore in a state of turbulence. The ferric chloride produced is carried away from the reaction chamber with excess hydrochloric acid gas, the ferric chloride is separated from this mixture by condensation, and the condensed ferric chloride is reduced to iron by treatment with hydrogen.

At the stage at which the ore is treated with hydrochloric acid gas the iron must be present as free ferric oxide, $Fe_2O_3$, with or without combined water. Thus, for example, ores rich in haematite, limonite or goethite may be treated, though it is preferable to roast ores in which the ferric oxide is hydrated to temperatures of from 300 to 500° C. to remove combined water. Ores which, when mined, contain the iron in some other form capable of conversion to ferric oxide may also be treated, provided that the iron compounds in them are first converted to ferric oxide. Thus, for example, ores containing siderite or chamosite may be rendered amenable to the treatment by roasting under oxidising conditions at from 400 to 800° C., preferably from 400 to 500° C., and those containing magnetite may first be likewise roasted within the same temperature range, preferably at about 500° C. It is immaterial if the gangue constituents of the ores include combined lime and magnesia, as surprisingly only some of this combined lime and magnesia, even when present as carbonate, is attacked by the hydrochloric acid gas to form calcium and magnesium chlorides. However, if ores containing appreciable lime and magnesia are used, it is desirable to treat the lime and magnesia chlorides in the tailings so as to regenerate hydrochloric acid gas. On the other hand ores in which the iron oxide is combined with titania as ilmenite cannot be economically treated according to the invention.

The invention will be more fully understood from the following description, reference being made to the drawings, which show the preferred form of plant and in which:

Figure 1 is a flow sheet, and Figure 2 diagrammatically illustrates the reaction vessel in which the ferric chloride is formed.

In the plant illustrated hydrochloric acid gas and hydrogen continuously circulate in proportions that vary at different points. A mixture of these gases in the ratio of about 50 to 60% hydrochloric acid gas and 50 to 34% hydrogen flows under a pressure of from 1 to 5 lbs. per square inch above atmospheric and at a temperature of about 150° C. from a chamber 1 through a pipe 2 to two pipes 3 and 26, both of which lead to a reaction vessel 4. The gas which flows through the pipe 3 passes through a heat exchanger 5. Some of this gas, after being heated in the heat exchanger, can be delivered to the pipe 26 through a pipe 73 controlled by a valve 74. In the pipe 3 the flows to the heat exchanger, and from it to the reaction vessel 4, are controlled by valves 55 and 75 respectively. The flow through the pipe 26 is controlled by a valve 27.

The reaction vessel 4, shown in Figure 2, contains a low-temperature chamber 6 and a hight-emperature chamber 7, and ore preheated to a temperature of 150 to 200° C. is fed to the former from a hopper 8 through a pipe 9. The ore is supplied to the hopper at a controlled rate by a mechanical feeder 30.

The ore should be in the form of fairly fine particles, ranging in size from, say, 1/10 of an inch in diameter to particles which will just pass through a sieve having 200 meshes to the linear inch. This ore is fluidised, that is to say, maintained in a state of turbulence, by the incoming hot gas, the velocity of which must be high enough for this purpose but not so high as to blow all the particles out of the reaction vessel. The fine particle size is required both to enable the ore to be formed into fluidised beds and to allow the ferric chloride formed to be easily distilled from the ore on reaching the temperature of volatilisation.

The vessel 4 consists of a mild steel shell lined by refractory brick and it is divided into the chambers 6 and 7 by an imperforate diaphragm 10. In the chamber 6 there are three perforated diaphragms 11, 12 and 13 of metal or refractory material which support beds of ore particles 14, 15 and 16, and in the chamber 7 there are two such diaphragms 17 and 18 which support beds of ore particles 19 and 20. The fluidised particles can flow from one bed to the next through pipes 21 to 24, the pipe 23 passing through the diaphragm 10 to lead the particles from the chamber 6 to the chamber 7, and from the last bed 20 the tailings from the reaction leave by a pipe 25.

The gas mixture leaving the chamber 1 is at a temperature between 100 and 200° C., say 170° C. Some of this gas, at a pressure between 1 and 5 lbs. per square inch, flows through the pipe 26 to the bottom of the chamber 6. It then flows upwards through the chamber at a linear velocity between 0.2 and 2 feet per second calculated on the volume of gas at room temperature through the empty vessel, maintaining each of the beds 14, 15 and 16 in a fluidised state. The ore forming these beds rapidly absorbs the hydrochloric acid gas to produce ferric chloride and steam. Very little ferric chloride is distilled at the temperature prevailing in the chamber 6. The reaction is exothermic and if necesary the beds of ore in the chamber 6 may be internally cooled. The steam produced, together with excess hydrochloric acid gas, the hydrogen and the small amount of ferric chloride which is volatilised, leaves the chamber 6 by a pipe 28 and passes through a cyclone 29 in which dust is removed from the gas stream.

The partially chloridised ore enters the chamber 7 through the pipe 23 and here is formed into the fluidised beds 19 and 20 by gas from the pipe 3. On its way to the chamber 7 this gas is heated to about 300° C. in the heat exchanger 5. In the chamber 7, the chloridising of the ferric oxide in the ore is completed, and the ferric chloride is distilled out and leaves with the excess hydrochloric acid gas, the hydrogen and remaining water of reaction through a pipe 33 leading to a cyclone 34, which is similar to the cyclone 29. The temperature in the chamber 7 is preferably from 250 to 400° C. At 200° C. slight distillation of ferric chloride takes place, the rate of distillation rising rapidly when the temperature exceeds 250° C.

The volume and temperature of the gases entering the chambers 6 and 7 can be controlled by the valves 27, 55 and 75.

The fluidised beds in the reaction vessel 4 are highly reactive and allow the reactions to be completed much more rapidly than when larger pieces of ore are treated. Thus, it has been found that the removal of ferric chloride by distillation in a stream of hydrochloric acid gas and hydrogen at about 200 to 300° C. can be completed in times of the order of 1 to 2 hours when the treated ore is crushed to pass through a 1/16 inch mesh sieve, whereas when pieces up to 5/8" are employed the time is extended to as much as 12 hours. A further important and unexpected advantage produced by the use of fluidised beds is that side reactions tending to produce ferric oxychloride, which is non-volatile, appear to be largely eliminated when the ore is fluidised during the main reaction.

In the chloridising steps it is essential to use an excess of hydrochloric acid gas considerably greater than that shown by the chloridsing equation, as otherwise the reaction will not go to completion. The excess ranges in practice between two and six times the theoretical quantity calculated from the chloridising equation, the exact figure depending upon the temperature employed for chloridising, increasing with the temperature. Thus, at a temperature of 300° C., as little as as 10% steam in the gases, an amount which corresponds to the use of more than five times the theoretical amount of hydrochloric acid gas, will very considerably reduce the speed of the reaction, whereas in the preferred temperature range of 150 to 190° C. in the chamber 6 as much as 30% steam, corresponding to less than twice the theoretical amount of hydrochloric acid gas, can be tolerated. It will be seen that by carrying out the chloridising reaction in two stages the amount of hydrochloric acid gas required is much less than if one stage is used, since the steam produced in the first stage is removed before the ore enters the chamber 7 to undergo the second and hotter stage of reaction.

In determining the conditions under which the chloridising reaction takes place, account must be taken of the hydrogen. This, it will be appreciated, is required in excess in the reduction reaction and cannot conveniently be separated from the hydrochloric acid gas. The excess is therefore present in the gases supplied to the reaction vessel 4. It does not take part in the reaction by which ferric chloride is formed, but it does tend to the production of ferrous chloride. It is found that the percentage of hydrogen that can be tolerated in the gases while the chloridising reaction is taking place is high provided that the temperature is maintained fairly low. The necessity to prevent ferrous chloride being produced imposes an upper limit of 400° C. on the temperature, but below this mixture of hydrochloric acid gas and hydrogen containing considerable percentages of hydrogen can be utilised, and this percentage can be increased the lower the temperature. Thus, at 350° C. mixtures containing as much as 30 to 50% of hydrogen can be used for chloridising iron oxide, whilst at 150° C. the percentage can be as high as 50 to 75% without leading to more than a trace of ferrous chloride.

The gases from the reaction chamber 6, on leaving the cyclone 29, flow through a pipe 35 to a water-cooled condenser 36 in which the water vapor formed in the reaction is condensed, carrying with it some hydrochloric acid gas, the remaining gas flowing onwards through a pipe 37 to a gasholder 38. The dilute aqueous solution of hydrochloric acid formed collects in the bottom of the condenser 36.

The gases from the reaction chamber 7, on leaving the cyclone 34, flow through a pipe 39 to a cooling chamber 40 the size and surface area of which is such that the gases are cooled to a temperature of 150 to 200° C., the ferric chloride being deposited as almost dry crystals on the walls of this chamber. The condensed ferric chloride is loose and flocculent and falls to the bottom of the chamber. To assist in loosening the ferric chloride crystals from the walls of the chamber, wires or baffles may be mounted inside the chamber and be vibrated or shaken periodically from outside the chamber. From the bottom of the chamber the ferric chloride is mechanically conveyed by a conveyor 41 to a reduction vessel 42.

The gases passing through the cooling chamber 40, after depositing the ferric chloride, flow through a pipe 43 to a water-cooled condenser 44, where the water vapor contained in them is condensed, carrying with it some hydrochloric acid. The resultant aqueous solution of hydrochloric acid collects in the bottom of the condenser 44. The remaining gases, consisting of a mixture of hydrochloric acid gas and hydrogen, flow through a pipe 45 to a second gas-holder 46.

The condensers 36 and 44 should cool the respective gases enough to condense at least the greater part of the water vapor in each, and the flow of the cooling water is preferably so adjusted that the gases are cooled to about atmospheric temperature and nearly all the water vapor is condensed.

The reduction of the condensed ferric chloride is carried out in two stages, the temperature in the first stage being between 300 and 500° C. so that ferrous chloride is formed and that in the second stage being between 500 and 800° C. so that sponge iron is formed from the ferrous chloride. The main reason for carrying out the reduction of the ferric chloride in two stages, the first at low temperatures and the second at higher temperatures, is that ferric chloride would be suddenly volatilised if it were brought into contact with the very hot gas which would be required for single-stage reduction, and this would lead to operating difficulties. By first reducing the ferric chloride at a relatively low temperature to non-volatile ferrous chloride, this difficulty is avoided.

The reduction vessel 42 comprises an upper chamber 47 and a lower chamber 48, and in it the ferric chloride is reduced by the reaction of hydrogen first to ferrous chloride at temperatures of from 300 to 500° C. in the upper chamber 47, and then to sponge iron at temperatures of from 500 to 800° C. in the lower chamber 48, from which it is discharged through a star valve 49 into a hopper 50. In the two chambers 47 and 48 the ferric chloride and its reduction products are treated as fluidised beds, the chambers 47 and 48 closely resembling the chambers 6 and 7 and the transfer from bed to bed and from the upper chamber to the lower being effected in the same way as in the reaction vessel 4. The reducing gas supplied to the chamber 47 is drawn from the gas-holder 38 through a pipe 51 by a pump 52 and flows through a pipe 53 and a heat-exchanger 54. This gas is joined at a point 56 by hydrogen which is supplied from an external source through a pipe 57 and flows through the hopper 50, thus cooling the sponge iron and itself becoming heated, before flowing through a pipe 58 to the point 56. This additional hydrogen must be supplied continuously to the system to make up for the hydrogen converted to hydrochloric acid gas in the reducing reaction. The mixed gases which enter the upper chamber 47 are at a temperature of from 300 to 400° C., which is high enough to bring about rapid reduction of ferric chloride to ferrous chloride. From the chamber 47 the gases, now slightly leaner in hydrogen and richer in hydrochloric acid, flow through a pipe 59 and a heat-exchanger 60, where they are heated to from 600 to 900° C., to the lower reduction chamber 48. Here the ferrous chloride is fully reduced to sponge iron. The hot reaction gases, now still richer in hydrochloric acid, flow through a pipe 61 and the heat exchanger 54 to the chamber 1 and mix with gases drawn from the gas-holder 46 by a pump 62.

The heating of the gases in the heat-exchanger 60 is effected by hot combustion gases from a combustion chamber 63 which is fed with fuel gas and air through pipes 64 and 65. These combustion gases after passing through the heat-exchanger 60 flow through a pipe 66 to the preheater 5 and are there utilised also for heating the gas in the pipe 3.

The aqueous solutions of hydrochloric acid collecting in the bottom of the condensers 36 and 44 are taken by pipes 67 and 68 respectively to a vessel 69, where they are treated with concentrated sulphuric acid introduced through a pipe 70. This sulphuric acid absorbs the water, so that the hydrochloric acid again becomes gaseous and flows from the vessel 69 through a pipe 71 to the gasholder 46. The sulphuric acid, which is removed through a pipe 72, becomes diluted but can be re-concentrated by distillation and used repeatedly.

The use of the two separate gasholders 38 and 46 leads to important advantages. The gases leaving the condenser 36 and going to the gasholder 38 are richer in hydrogen than those leaving the condenser 44 and are therefore more suitable for use in the reduction vessel 42. The reason for this is that the gases leaving the condenser 36 originate from the low-temperature chloridising chamber 6. It has already been explained that at low temperatures a higher percentage of water can be tolerated in the chloridising gases and a smaller volume of hydrochloric gas is required to carry out a given degree of chloridising than at higher temperatures. Hence, for a given mixture of hydrogen and hydrochloric acid a greater proportion of the hydrochloric acid in the gas is absorbed by iron ore at lower than at higher temperatures, and the gas leaving the reaction chamber is therefore richer in hydrogen.

The second gasholder 46 receives gases obtained from the hotter reaction chamber 7 where, because of the smaller percentage of water which can be tolerated, much larger volumes of hydrochloric acid and hydrogen have to be used and relatively less absorption of hydrochloric acid takes place; the gas leaving the reaction chamber is therefore richer in hydrochloric acid gas. Moreover, all the hydrochloric acid gas recovered from the condensers 36 and 44 goes ultimately to the gasholder 46, the gas in which is therefore further enriched in hydrochloric acid. The net result is that the gases in this holder are richer in hydrochloric acid than those in the first gasholder, and are more suitable for use in the chloridising reaction chamber 4 than in the reduction vessel 42. Thus, as an actual example, when a gas containing 66% hydrochloric acid and 33% hydrogen was fed to the reaction chamber 6, the gases from the condenser 36 contained 52% hydrogen, whereas when gas of a similar composition was fed to the reaction chamber 7 (the volume required being three times the volume employed in the chamber 6), the gases in the condenser 44 contained only 38% hydrogen.

The storage of the hydrogen-rich gas in a separate gasholder allows it to be used initially in reducing the ferric chloride to ferrous chloride at fairly low temperatures (300–400° C.), with resulting thermal advantages. Equally important, both at the lower temperatures and at the higher temperatures used for the reduction of ferrous chloride to sponge iron, the use of a richer hydrogen gas is advantageous in reducing the volume of excess gas required for completing the reaction.

The hydrogen content of the gas supplied to the reduction chamber 42 is, of course, increased by the hydrogen introduced at the point 56. In the example given, the hydrogen content is increased to 68% in this way.

The sponge iron produced is extremely pure, containing only traces of sulphur, phosphorus and silicon. It may be used for the production of high-grade steels or of finished parts pressed from powdered iron.

The plant shown may be modified in many respects. For example, in the reaction chamber 4 all the beds are shown of identical diameter throughout, but if desired the diameters of each bed may vary so that in turn the gas velocities vary in such a way as to maintain the fluidising conditions at optimum values. In particular, the gas velocities should increase somewhat as the ore passes downwards through the chamber 6 because the particles will increase in weight as ferric chloride is formed, whilst on the contrary in the lower chamber 7, where the ferric chloride is stripped by the hotter gases and removed from the ore, the optimum gas velocities steadily decrease as the tailings decrease in density. Accordingly, it is preferable for the diameter of the lowest bed 20 to be slightly greater than that of the bed 19 immediately above it, whilst this in turn is preferably of somewhat larger diameter than the bed 16.

Further, the number of beds in the chambers 6 and 7 may be altered, but it is preferable to have at least two in each chamber.

Again, the chamber 6 may be completely separate from the chamber 7, means being provided for feeding treated ore from the chamber 6 to the chamber 7.

The cyclones 29 and 34 may be placed inside the chambers 6 and 7 respectively instead of outside them.

If desired, instead of carrying out the reduction process under fluidising conditions it may be carried out in rotary hearth furnaces such as the Herrschoff furnace.

Again, instead of recovering the hydrochloric acid gas from the aqueous solutions by means of sulphuric acid, these solutions may be utilised elsewhere and fresh hydrochloric acid gas from an external source may be supplied to the gas-holder 46.

I claim:

1. A process for obtaining iron from iron ore containing ferric oxide by first converting the oxide into ferric chloride by treatment with hydrochloric acid gas and thereafter reducing the ferric chloride to iron by treatment with hydrogen, characterised by the use of a continuously circulating mixture of hydrochloric acid gas and hydrogen, said mixture at all times containing substantial amounts of both hydrochloric acid and hydrogen and being successively brought into contact with said ore and with the ferric chloride derived from the ore, said mixture being enriched in hydrochloric acid gas before coming into contact with the ore and being enriched in hydrogen before coming into contact with the ferric chloride, said enrichment in hydrochloric acid gas being automatically achieved by the reducing action of the mixture on the ferric chloride, the mixture as it is brought into contact with the ore containing between about 30% and 50% hydrogen and the balance substantially all hydrochloric acid gas, and said treatment of the ore being carried out at a maximum temperature not substantially above 400° C., the hydrogen content of the mixture at this time being kept sufficiently low to prevent substantially the formation of ferrous chloride at the temperature at which the treatment of the ore is carried out.

2. A process according to claim 1 in which the treatment of the ore with hydrochloric acid gas is carried out in two stages, the temperature in the first stage being between 100 and 200° C. and a substantial proportion of the water vapor formed being expelled with at the most only a small amount of ferric chloride, and the temperature in the second stage being between 200 and 400° C. to volatilise both the ferric chloride already formed and additional ferric chloride formed from the ore.

3. A process for obtaining iron from iron ore containing ferric oxide which comprises treating the ore in the form of a fluidised bed in a reaction vessel with a gaseous mixture comprising a substantial amount of hydrogen and an excess of hydrochloric acid to produce ferric chloride, said mixture being between about 30% and 50% hydrogen, carrying the ferric chloride away from the reaction vessel with excess hydrochloric acid and hydrogen at a temperature above the vaporizing point of ferric chloride but not substantially above 400° C., separating the ferric chloride from the hydrochloric acid and hydrogen by condensation, returning a part of the separated hydrochloric acid gas and hydrogen directly to the reaction vessel, enriching another part of the separated hydrochloric acid gas with hydrogen, treating the condensed ferric chloride with the hydrogen-enriched gas in a second vessel to reduce the ferric chloride to iron, withdrawing spent gaseous mixture from the second vessel, and adding this spent gaseous mixture to the separated hydrochloric acid gas and hydrogen which is returned to the first reaction vessel.

4. A process for obtaining iron from iron ore containing ferric oxide which comprises circulating a mixture containing at all times substantial amounts of both hydrochloric acid gas and hydrogen but which varies in composition in a controlled manner at different points, said mixture at all times containing hydrogen to the extent of not less than about 25% of the total gases, treating the ore in a first stage with a part of this mixture rich in hydrochloric acid gas and at a temperature between 100 to 200° C. to yield ferric chloride and water vapor, expelling a substantial proportion of the water vapor with hydrogen and unreacted hydrochloric acid gas and at the most only a small amount of ferric chloride, separating the hydrogen and hydrochloric acid gas so expelled from the other components for return to said circulating mixture, then treating the ore in a second stage with another part of the circulating mixture rich in hydrochloric acid gas and at a temperature between 200 and 400° C. to volatilise the ferric chloride already present and form additional ferric chloride, said mixture employed in said two stages containing hydrogen to the extent of about 30% to 50% and the balance substantially all hydrochloric acid gas, separating the volatilised ferric chloride from the solid residue, condensing said ferric chloride and reducing the same to iron by treatment with a part of the circulating mixture at a temperature of between about 300° and 800° C., said part of the mixture being enriched with hydrogen prior to use in said reducing treatment to increase the content thereof above 50%, and returning the gas resulting from the reducing treatment to said circulating mixture to be used in said first and second stages.

5. A process according to claim 4 in which the ore is treated in a reaction vessel divided into two parts and is fluidised by the gas during the treatment, the fluidised material flowing from the first part to the second part for the second stage of the chloridising treatment.

6. A process according to claim 4 in which the temperature of the hydrochloric acid gas is between 150 and 190° C. in the first stage of the chloridising treatment and between 250 and 350° C. in the second state of the chloridising treatment.

7. A process according to claim 5 in which the temperature of the hydrochloric acid gas is between 150 and 190° C. in the first stage of the chloridising treatment and between 250 and 350° C. in the second stage of the chloridising treatment.

8. A process according to claim 4 in which the reaction gases from the first stage of the chloridising treatment are cooled to condense at least the greater part of the water vapor and to produce an aqueous solution of hydrochloric acid, and the hydrogen-rich gas remaining after the cooling is used for the reduction of the ferric chloride.

9. A process according to claim 8 in which the reaction gases from the second stage of the chloridising treatment are cooled to between 150 and 200° C. to cause ferric chloride to precipitate, and then are further cooled to condense at least the greater part of the water vapor and to produce an aqueous solution of hydrochloric acid, and the gas remaining after the second cooling is enriched in hydrochloric acid gas derived from the circulating mixture and used for the conversion of further ferric oxide to ferric chloride.

10. A process in accordance with claim 4 in which the ferric chloride is first reduced to ferrous chloride and then to sponge iron, characterised in that the reduction is effected by part of the circulating gas mixture which after effecting the reduction to ferrous chloride at a temperature between 300 and 500° C. is heated and then used to effect the reduction to sponge iron at a temperature between 500 and 800° C.

11. A process for obtaining iron from iron ore containing ferric oxide which comprises treating the ore in a first vessel with a gaseous mixture comprising a substantial amount of hydrogen and an excess of hydrochloric acid to convert the ferric oxide into ferric chloride, the gaseous mixture introduced into the first vessel being between about 25% and 50% hydrogen, withdrawing spent gaseous mixture from the first vessel, returning part of the spent gaseous mixture to the first vessel, enriching another part of the spent gaseous mixture with an amount of hydrogen in excess of that required to reduce the ferric chloride to iron, treating the ferric chloride with the hydrogen-enriched gaseous mixture in a second vessel to reduce the ferric chloride to iron, withdrawing spent gaseous mixture from the second vessel, and adding this spent gaseous mixture to said part of the first gaseous mixture that is returned to the first vessel.

12. A process for obtaining iron from iron ore containing ferric oxide which comprises treating the ore in a first vessel at a temperature between 150° and 400° C. with a gaseous mixture comprising a substantial amount of hydrogen and an excess of hydrochloric acid to convert the ferric oxide into ferric chloride, said mixture being between about 30% and 50% hydrogen, withdrawing spent gaseous mixture from the first vessel, enriching at least part of the spent gaseous mixture in hydrogen, to provide more than a 50% hydrogen content, reducing the ferric chloride to iron by the hydrogen-enriched mixture in a second vessel and thereby enriching the gaseous mixture in hydrochloric acid gas, and introducing this mixture into the first vessel.

13. A process for obtaining iron from iron ore containing ferric oxide which comprises treating the ore in a first stage at a temperature below the vaporizing temperature of ferric chloride with excess of a mixture of substantial amounts of both hydrogen and hydrochloric acid gas, said mixture being between about 30% and 50% hydrogen, treating the ore in a second stage at a temperature above the vaporizing temperature of ferric chloride with a further quantity of such mixture of hydrogen and hydrochloric acid gas also in excess to produce gaseous ferric chloride, condensing the ferric chloride, withdrawing to a mixing point spent gas mixture from the condensed ferric chloride of the second stage, withdrawing spent gas mixture from the first stage and enriching this mixture in hydrogen, treating the condensed ferric chloride with the hydrogen-enriched gas mixture to reduce the ferric chloride to iron, withdrawing to the mixing point spent gas mixture from the reducing treatment, and supplying the mixture formed at the mixing point to the chloridising stages to chloridise fresh ore.

14. Apparatus for use in obtaining iron from iron ore, comprising the combination of a chloridising reaction vessel for the treatment of ore to produce ferric chloride, means for removing the ferric chloride in gaseous form from the reaction vessel, a condenser for the gaseous ferric chloride, a reduction chamber, means for introducing the condensed ferric chloride into the reduction chamber, means for leading gases from the reaction vessel to the reduction chamber to reduce the ferric chloride, said last mentioned means including devices for separating said gases into two components having different hydrogen concentrations and for leading only the component of higher hydrogen concentration to the reduction chamber, means for leading hydrochloric acid gas produced in the reduction chamber, together with unchanged hydrogen, to the chloridising reaction vessel, and means for introducing fresh hydrogen into the reduction chamber.

15. Apparatus according to claim 14 in which the chloridising reaction vessel is in two parts through which the ore passes in succession, and in which said devices comprise means for removing steam and gases from the part first entered by the ore and leading these to a condenser, and means for transmitting the hydrogen-rich gas from this condenser to the reduction chamber.

16. Apparatus according to claim 15 in which the condenser for the ferric chloride is placed in the path of the gases leaving the second part of the chloridising reaction vessel, means for leading the gases leaving this condenser to a second condenser for steam contained in them, and means for delivering the residual gases from this second condenser to the chloridising reaction vessel.

17. Apparatus according to claim 15 including a pump for delivering gas to the reduction chamber, a second pump for delivering gas to the chloridizing reaction vessel, two gasholders, one constituting a reservoir of hydrogen-rich gas and being placed between the condenser for steam from the first part of the chloridising reaction vessel and said pump by which the gas from this holder is delivered to the reduction chamber, and the other constituting a reservoir for gas rich in hydrochloric acid and being placed between the condenser for steam from the second part of the chloridising reaction vessel and said second pump by which gas from this holder is delivered to the chloridising reaction vessel.

References Cited in the file of this patent

UNITED STATES PATENTS

| 942,569 | Koehler | Dec. 7, 1909 |
| 1,979,280 | Mitchell | Nov. 6, 1934 |
| 2,290,843 | Kinney | July 21, 1942 |

FOREIGN PATENTS

| 728,703 | Germany | Dec. 2, 1942 |
| 587,774 | Great Britain | May 6, 1947 |

OTHER REFERENCES

Kalback, J. C., "Improving Solids-Gas Contacting by Fluidization," Chemical and Metallurgical Engineering, June 1944 issue, pages 94–98.